(12) United States Patent
Faulkner et al.

(10) Patent No.: US 7,967,354 B2
(45) Date of Patent: Jun. 28, 2011

(54) MIXED SIZE PRODUCT HANDLING END OF ARM TOOL

(75) Inventors: Donald A. Faulkner, Leonard, MI (US);
John R. McLean, Fenton, MI (US);
Paul A. Santi, Washington, MI (US);
Paul Skrna, Orion Township, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 550 days.

(21) Appl. No.: 12/115,754

(22) Filed: May 6, 2008

(65) Prior Publication Data

US 2009/0279999 A1 Nov. 12, 2009

(51) Int. Cl.
*B25J 15/00* (2006.01)
*B66F 9/18* (2006.01)

(52) U.S. Cl. ............... 294/103.1; 294/67.22; 294/119.1; 414/622; 901/34

(58) Field of Classification Search ........... 294/2, 67.22, 294/67.33, 67.5, 86.4, 103.1, 119.1; 414/621–623, 414/741, 24.5; 901/34
See application file for complete search history.

(56) References Cited

U.S. PATENT DOCUMENTS

| | | | | |
|---|---|---|---|---|
| 2,869,742 A | * | 1/1959 | Hileman | 414/622 |
| 3,596,776 A | * | 8/1971 | Melin | 414/788 |
| 3,684,114 A | * | 8/1972 | Cosgrove et al. | 414/622 |
| 4,000,923 A | * | 1/1977 | Baldwin | 294/81.5 |
| 4,219,300 A | * | 8/1980 | McMillan | 414/420 |
| 4,607,998 A | | 8/1986 | Hawkes | |
| 4,610,597 A | | 9/1986 | Wright | |
| 4,614,476 A | | 9/1986 | Mello Ribeiro Pinto | |
| 4,715,636 A | | 12/1987 | Wiesner et al. | |
| 4,718,815 A | | 1/1988 | Lindgren | |
| 4,756,662 A | | 7/1988 | Tanie et al. | |
| 4,815,781 A | | 3/1989 | No et al. | |
| 4,821,408 A | | 4/1989 | Speller, Sr. et al. | |
| 4,976,484 A | | 12/1990 | Nomaru et al. | |
| 5,042,862 A | * | 8/1991 | Tubke | 294/86.4 |
| 5,092,646 A | | 3/1992 | Smallridge | |
| 5,391,050 A | * | 2/1995 | Gatteschi | 414/796 |
| 5,628,539 A | * | 5/1997 | Muchalov et al. | 294/86.4 |
| 5,634,376 A | | 6/1997 | Kitamura | |
| 6,082,797 A | * | 7/2000 | Antonette | 294/103.1 |
| 6,516,681 B1 | | 2/2003 | Pierrot et al. | |
| 6,543,987 B2 | | 4/2003 | Ehrat | |
| 7,018,163 B2 | * | 3/2006 | Beavers et al. | 414/772 |

FOREIGN PATENT DOCUMENTS

DE 42 38 101 A1 5/1994

* cited by examiner

*Primary Examiner* — Dean J Kramer
(74) *Attorney, Agent, or Firm* — Fraser Clemens Martin & Miller LLC; William J. Clemens

(57) ABSTRACT

A mixed size product end of arm tooling is used in conjunction with a robot to pick mixed size product and place the product onto a pallet or layers resting on top of a pallet. The end of arm tooling includes two center rails/forks mounted to a base. Two outer rails/forks are mounted to linear bearings that guide the outer rails/forks when moving inwardly or outwardly from the center rails for pre-sizing to the product. Pusher arms are formed of two outer pusher arms and one center pusher arm. These pusher arms are attached to linear bushings that guide the pusher arms forward and backward. The pusher arms push off the product simultaneously as the robot is withdrawing the rails.

20 Claims, 6 Drawing Sheets

MIXED SIZE PRODUCT HANDLING END OF ARM TOOL

FIELD OF THE INVENTION

The present invention relates generally to a method and apparatus for material handling. More specifically, the present invention relates to an adaptable end of arm tool providing automatic sizing of the tooling relative to the unique product size being handled.

BACKGROUND OF THE INVENTION

The distribution of various packages of goods for the warehouse and distribution market, such as dry grocery market, generally involves high numbers of product (SKU's) that correspond to many unique sized products. Typically, an industry customer can have over 15,000 SKU's. A flexible end of arm tool is desired for distribution of all sized product.

End of an tools (EOAT's) are used in conjunction with robot arms for transporting packaged goods to and from pallets. EOAT's, therefore, must be adaptable to different sizes and shapes of packaging. Common EOAT's provide either servo driven or pneumatic fork/rail type tools with or without top clamping features, or a servo driven or pneumatic pusher with fixed fork/rail underneath support type end of arm tooling with or without clamping features.

The servo-driven or pneumatic fork/rail/platform type end of arm tool takes advantage of underneath extendable/retractable support forks or rails or platform (hereinafter referred as forks/rails/platform) that provides the product support function of the end of arm tool. This known EOAT typically has a top pad or clamp, or even an array of vacuum cups, that descends to capture the product between the top pad/clamp and the underneath extendable/retractable support forks/rails/platform. The tool releases the product by lifting the top pad/clamp and withdrawing or retracting the forks/rails/platform from underneath the product.

The fixed fork/rail with servo-driven or pneumatic pusher type end of arm tool takes advantage of underneath fixed support forks/rails/platform that provides the product support function of the end of arm tool. The tool typically has a top pad or clamp that descends to capture the product between the top pad/clamp and the underneath fixed support forks/rails/platform. The tool releases the product by lifting the top pad/clamp and pushing the product off of the forks/rails/platform via a pusher arm.

A disadvantage of these prior art EOAT's is that both the underneath rails and top pad/clamp are typically sized two ways. The first method is sizing for the largest product, there are a number of forks/rails/platform that are spread-out underneath the product to allow for stable carrying of the product to be handled, forcing the EOAT to be large and having excess forks/rails/platform providing out the sides of smaller products (product sizes that are less than the largest product size) being handled with the same tool. Sometimes the forks/rails can be withdrawn individually, but still cause side-to-side restrictions at the rear end of the tool when the product is handled where the withdrawn forks/rails/platform are retracted out of the back of the tool, causing restrictions to adjacent product. This restriction is typically experienced when product is being placed next to other product during the building of a layer of products, preventing product to product placement.

Additionally, the use of a large pad/clamp to secure the product between the pad/clamp and the underneath support forks/rails/platform causes the end of arm tool to be large and have excess pad/clamp surface protruding out the sides of smaller products (product sizes that are less than the largest product size) being handled with the same tool. This prevents product from being placed next to other product.

The second method is sizing for the smallest product, where there are fewer forks/rails/platform, and therefore a narrower platform, the rails are spread-out underneath the product to allow a smaller overall width. This reduces or eliminates the side-to-side restriction when placing product next to other product. However, this prevents the tool from handling large product, where out-board product support is required to handle the product reliably.

Additionally, where there is a small pad/clamp to secure the product between the pad/clamp and the underneath support forks/rails/platform, this also prevents the end of arm tool from securely capturing or clamping larger product during handling, risking that the product is dropped during handling.

U.S. Pat. No. 7,153,085 teaches a multi-modal package handling tool including vacuum carrying units and extendable package grippers.

U.S. Pat. No. 4,976,484 teaches an adjustable work positioning device including two pincer members that may be moved toward and away from each other and can be varied in length to accommodate different shaped work pieces.

U.S. Pat. No. 4,815,781 teaches an industrial robot hand including a fixed frame for connection to the end wrist portion of the arm of an industrial robot and a movable frame supported by the fixed frame and movable in a horizontal direction via guide rods. Pivotable plates are provided with engaging members along the movable frame to secure the material to be handled.

DE 42 38 101 A1 teaches a mechanism incorporating a steering arm having several hollow bars supporting a slide supporting a carriage, which slides on the bars. Clamping plates are located on the ends of the bars. The hollow bars accommodate pretensioned threaded rods. A piston rod is located centrally in the cage, and the stationary piston moves in a cylinder, associated with the slide. The hollow bars form pressure medium feeds to the cylinder.

It is, therefore, desirable to provide a more versatile EOAT for use with any product line.

SUMMARY OF THE INVENTION

The present invention combines automatic moveable fork/rails with an automatic segmented top paddle to provide a combined "pinching" or "gripping" force at predetermined optimal locations along the width/length of the product; thereby allowing for secure handling of the product without protruding out the front, either side, or the rear-projection of the product sides at the rear of the tooling.

In a preferred embodiment, a clamping paddle provides for automatic top paddle sizing above the product by allowing the top paddle to be segmented and stay stationary above the center fixed forks/rails. While still travelling, the out-board forks/rails may be re-sized to the unique product size prior to handling the product. This provides automatic sizing of the tooling relative to the unique product size being handled and quicker handling times since little movement is required within the tooling to secure or release the product and optimum clamping of the product regardless of product size.

The present invention provides for automatic fork/rail sizing underneath the product by allowing out-board forks/rails to be re-sized prior to the handling of mixed size product, providing optimal handling positions relative to each unique product size. By optimally sizing and locating of the forks/rails underneath the product, no restrictions for picking or placing are encountered, quicker cycle times are experienced, and a more secure handling of the product is achieved.

In a preferred embodiment, the method of the present invention is for transporting a product comprising the steps of:
  providing a robot for manipulating a servo-actuated end of arm tool;
  monitoring product presence with a sensor provided with the end of arm tool;
  moving opposing outer rails toward or away from a center rail of the end of arm tool for pre-sizing the support of the sensed product;
  simultaneously moving opposing outer pusher arms toward or away from a center pusher arm of the end of arm tool for pre-sizing of the sensed product;
  simultaneously moving clamping paddles toward or away from corresponding rails of the end of arm tool for pre-sizing of the sensed product;
  picking a sensed product with the pre-sized the end of arm tool;
  resting a side of the sensed product along the pusher arms; and
  clamping a sensed product between the rails and the clamping paddles.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

Figure 1:
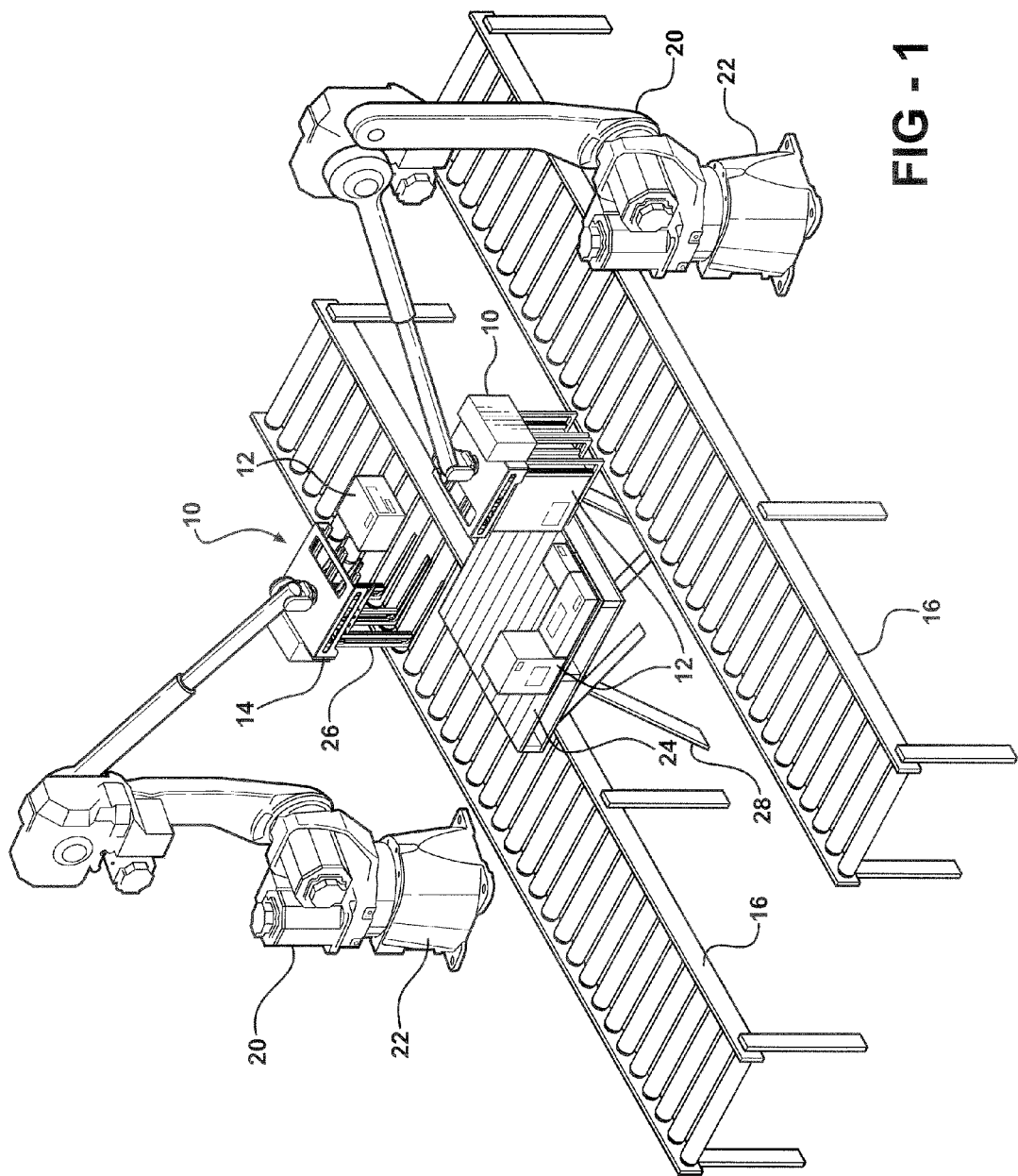
FIG. 1 illustrates a perspective view of a typical palletizing work cell with robot having a mixed sized product handling end of arm tool of the present invention.
Figure 2:
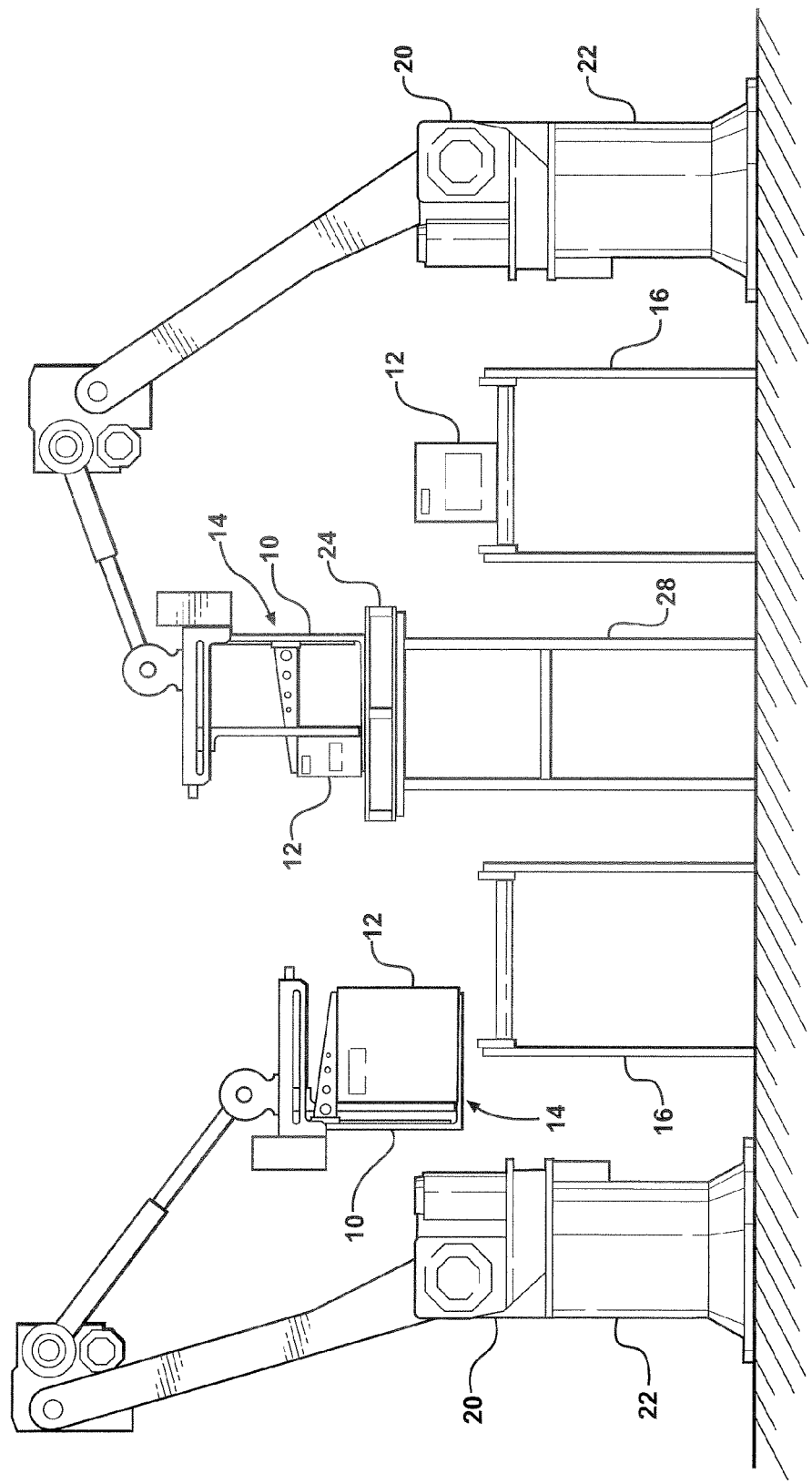
FIG. 2 illustrates a side elevation view of the work cell shown in FIG. 1.
Figure 3:
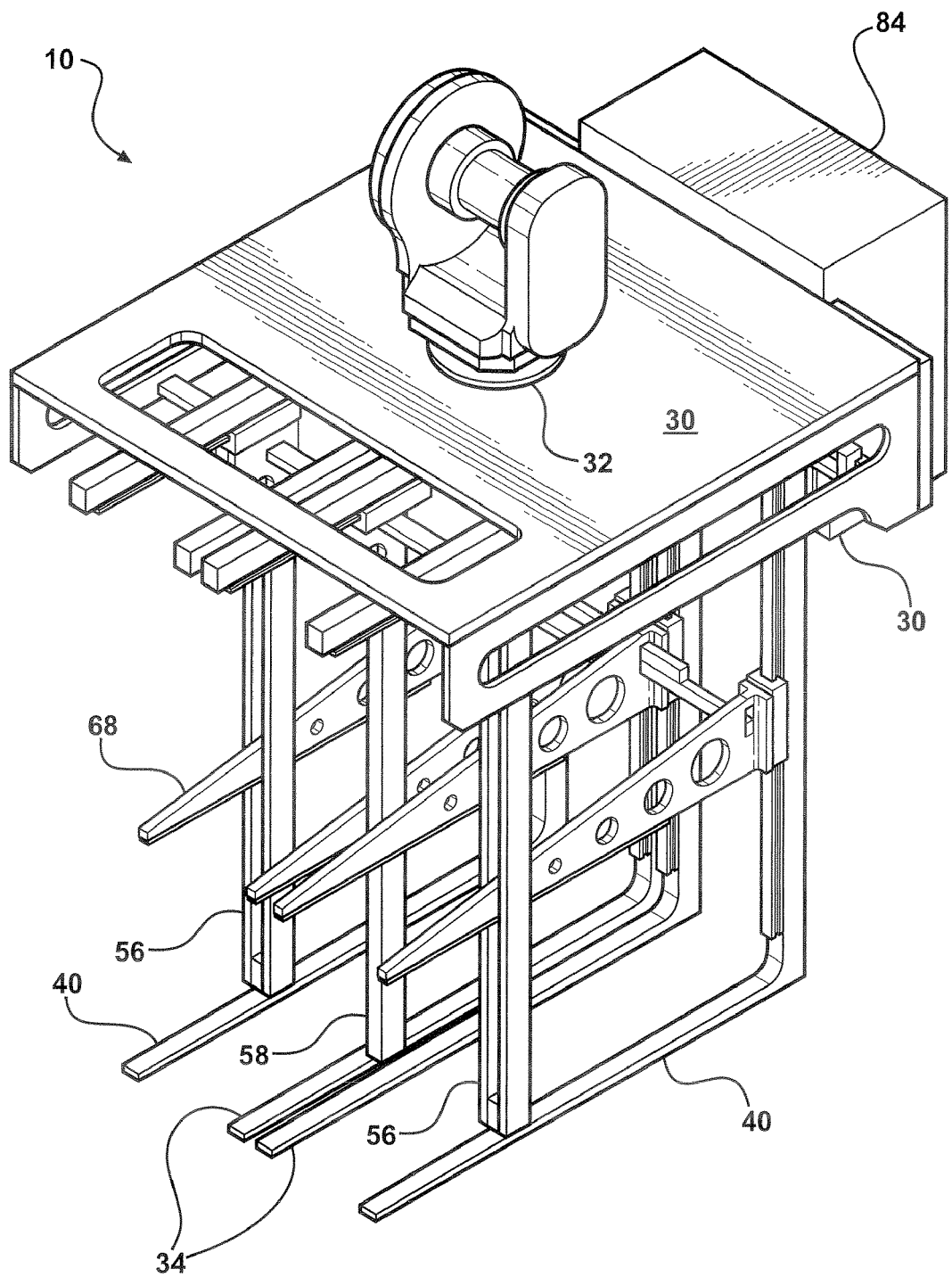
FIG. 3 illustrates the mixed sized product handling end of arm tool of the present invention in the "ready to pick" position.

With reference to FIGS. 1 and 2, the mixed size product handling end of arm tool assembly 10 of the present invention utilizes proven methods of material handling by uniquely combining three motions to provide flexibility in handling mixed sizes and shapes of products (i.e., cases, bundles, etc. . . . ).

In a first preferred embodiment, the motions are servo-actuated. The servo-driven motions allow the EOAT 10 to securely handle multiple product sizes, enabling mixed load palletizing and accommodating product changes under program control with no manual set-up required beyond initial product definition. The EOAT 10 handles the product 12 by using both fixed and servo-driven sets of rails 14 that support the product 12 underneath. Typically, but not always, the product 12 is on a set of conveyor rollers 16 or raised on a set of rails to allow underneath access to the product by the EOAT rails 14. The EOAT 10 incorporates a servo-driven paddle that lowers onto the product 12, thereby applying the force necessary to secure the product 12 between the paddle and the rails 14. This combined motion/force allows for secure handling of the product 12.

The Mixed Size Product End of Arm Tooling 10 (hereinafter referred to as EOAT) is preferably used in conjunction with a robot 20, oftentimes mounted on a riser 22, located in an arrangement that allows the robot 20 to manipulate the EOAT 10 to pick mixed size product 12 and place the product 12 onto a pallet 24 or layers resting on top of a pallet 24. Typically, the mixed size product 12 arrives via a conveyor 16 to one or more pick positions 26. Typically, the pallet 24 is located on a stand, lift unit 28, or conveyor. When a pallet 24 is full, it is removed manually by a fork lift truck or other automated means of transport.

With reference to FIGS. 3-6, a preferred embodiment of the EOAT 10 of the present invention is there shown. The EOAT 10 includes a base 30 which mounts typically to a robot faceplate 32. The base 30 is the main infrastructure of the EOAT 10 to what all fixed mounted components are assembled.

Figure 6:
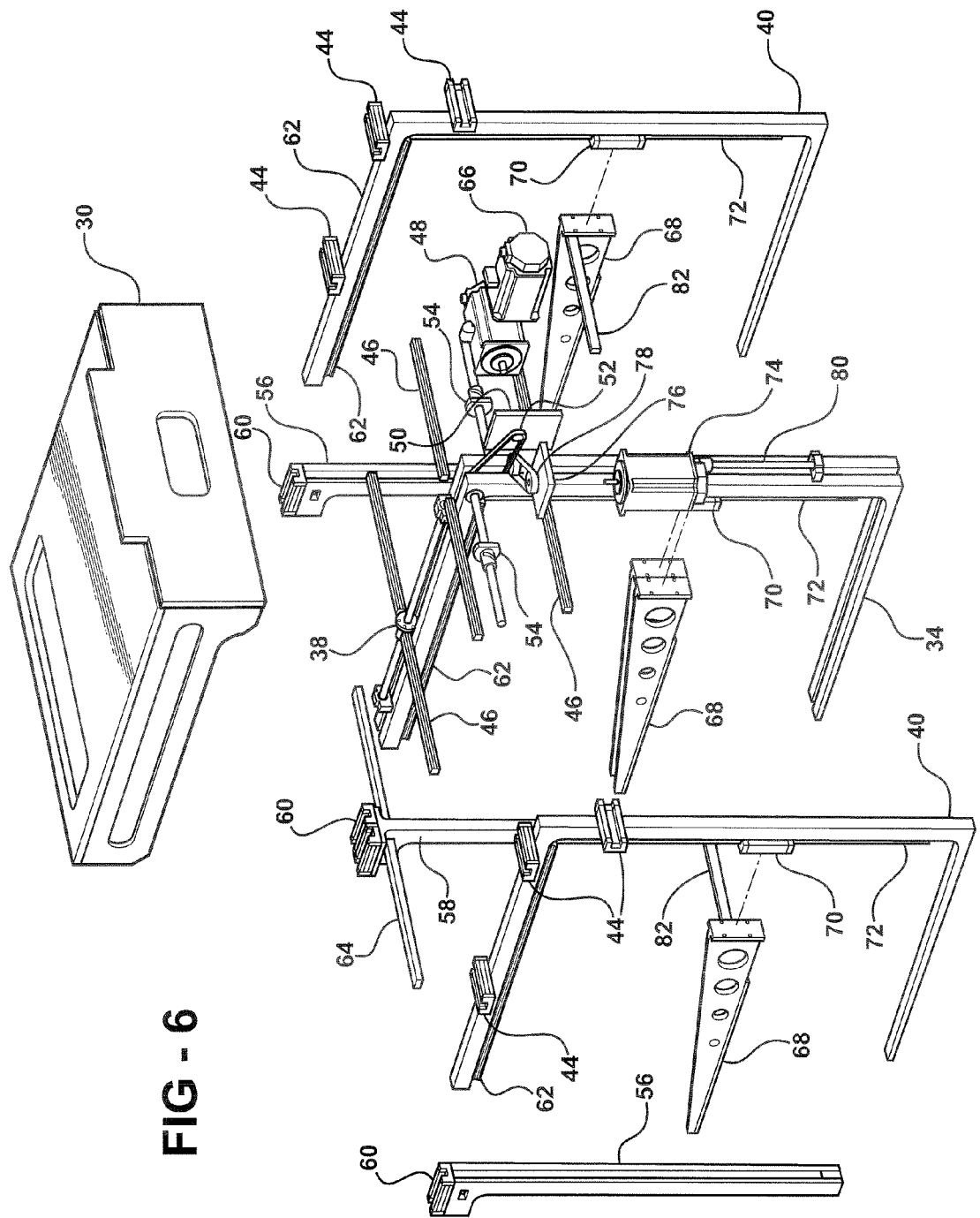
FIG. 6 is an exploded rear view of the mixed sized product handling end of arm tool of the present invention.

As shown in FIG. 6, two center rails/forks 34 are mounted to the fixed portions of a ball screw assembly 38 and then ultimately to the base 30. The two outer rails/forks 40 are mounted to linear bearings 44 that guide the outer rails/forks 40 when they are moving inwardly or outwardly. Each linear bearing 44 is mounted to a bearing rail 46, which in turn is attached securely to the base 30. A rail/fork motor 48 is attached to a mounting plate 50, which is connected to the fixed two center rails/forks 34, providing a fixed mounting ultimately to the base 30. The rail/fork motor 48 has a belt assembly 52 that connects the motor shaft to two fork/rail ball screw assemblies 54. The two outer rails/forks 40 are connected to the moveable portion of the ball screw assembly 54. The action of the rail/fork motor 48 is passed through the belt assembly 52, then to the two ball screw assemblies 54, and finally to the moveable portion of the ball screw assembly 54 where the two outer rails/forks 40 are connected allowing for the inward and outward motion of the two outer rails/forks 40. The rails/forks 34, 40 are generally C-shaped with horizontally extending upper and lower arms extending from opposite ends of a vertical bar.

The pusher arms are comprised of two outer pusher arms 56 and one center pusher arm 58. These pusher arms 56 and 58 are attached to linear bushings 60 that guide the pusher arms 56 and 58 forward and backward. Each linear bearing 60 is mounted to a bearing rail 62, which in turn is attached securely to the base 30. The two outer pusher arms 56 and the one center pusher arm 58 are connected together via an upper guide bar 64. The guide bar 64 is firmly connected to the one center pusher arm 58. The two outer pusher arms 56 are not fixed to the guide bar 64; thereby, providing the common forward and backward motion, while giving the ability to move inward and outward from the center pusher arm 58. A pusher motor 66 is attached to the ball screw assembly 38 which in turn is connected to the base 30. This pusher motor 66 in combination with the ball screw assembly 38 creates the motion to advance and retract the center pusher arm 58; which in turn through the guide bar 64 transposes this same linear motion to the two outside pusher arms 56.

The clamp arms or paddle segments 68 are attached to linear bushings 70. These linear bushings 70 guide the clamp arms 68 up and down to secure the product against the rails/forks 34 and 40. Each linear bearing 70 is mounted to a bearing rail 72, which in turn is mounted to either the two fixed center rails/forks 34 or the two moveable outer rails/forks 40. A clamp motor 74 is attached to a mounting plate 76, which is connected to the fixed two center rails/forks 34, providing a fixed mounting ultimately to the base 30. The clamp motor 74 has a belt assembly 78 that connects the motor shaft to one clamp ball screw assembly 80. The clamp arms 68 are all coupled together via two clamp connection bars 82; the center clamp arms 68 are connected to the moveable portion of the ball screw assembly 80. The action of the clamp motor 74 is passed through the belt assembly 78, then to the one ball screw assembly 80, and finally to the moveable portion of the ball screw assembly where, with the two connection bars 82 that connect all three of the clamp arms 68, they provide the up and down motion of the clamps 68. A motor cover 84 (FIGS. 3-5) is also provided to cover the motors 48, 66 and 74.

A method for transporting a product using the end of arm tool of the present invention is preferably comprising the steps of: providing a robot for manipulating a servo-actuated end of arm tool; monitoring product presence with a sensor provided with the end of arm tool; moving opposing outer rails toward or away from a center rail of the end of arm tool for pre-sizing the support of the sensed product; simultaneously moving pusher arms toward or away from the leading tips of the underneath rails of the end of arm tool for pre-sizing of the sensed product (provides a pocket for the product to be contained); simultaneously moving clamping arms/paddles toward or away from corresponding rails of the end of arm tool for pre-sizing of the sensed product; picking a sensed product with the pre-sized end of arm tool; resting a side of the sensed product along the pusher arms; clamping a sensed product between the rails and the clamping paddles; releasing the sensed product from the end of arm tool by slightly raising the clamping paddles and pushing with the pusher arms; and simultaneously withdrawing the outer and center rails from supporting the sensed product.

Figure 4:
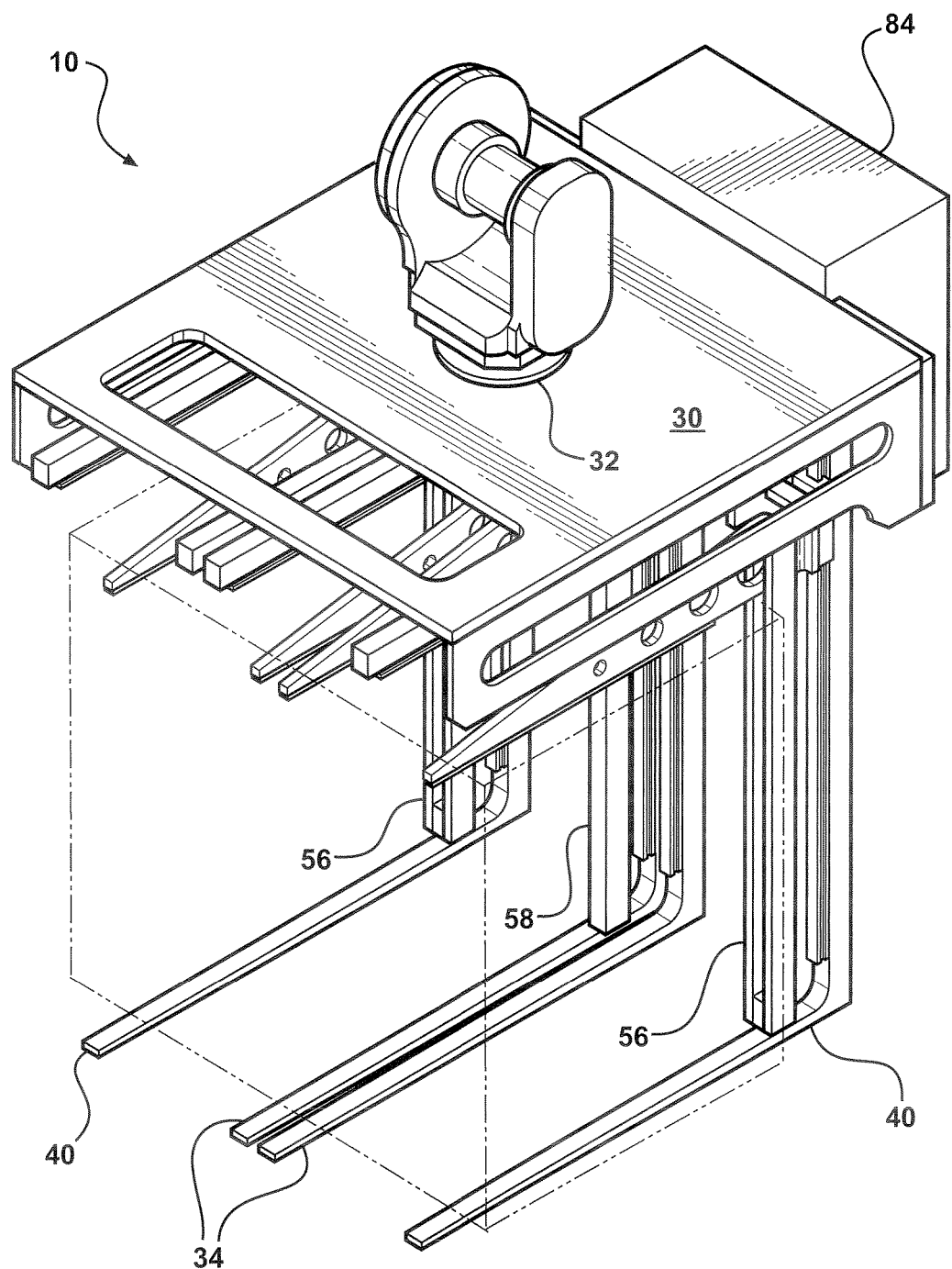
FIG. 4 illustrates the mixed sized product handling end of arm tool of the present invention in the maximum size position.
Figure 5:
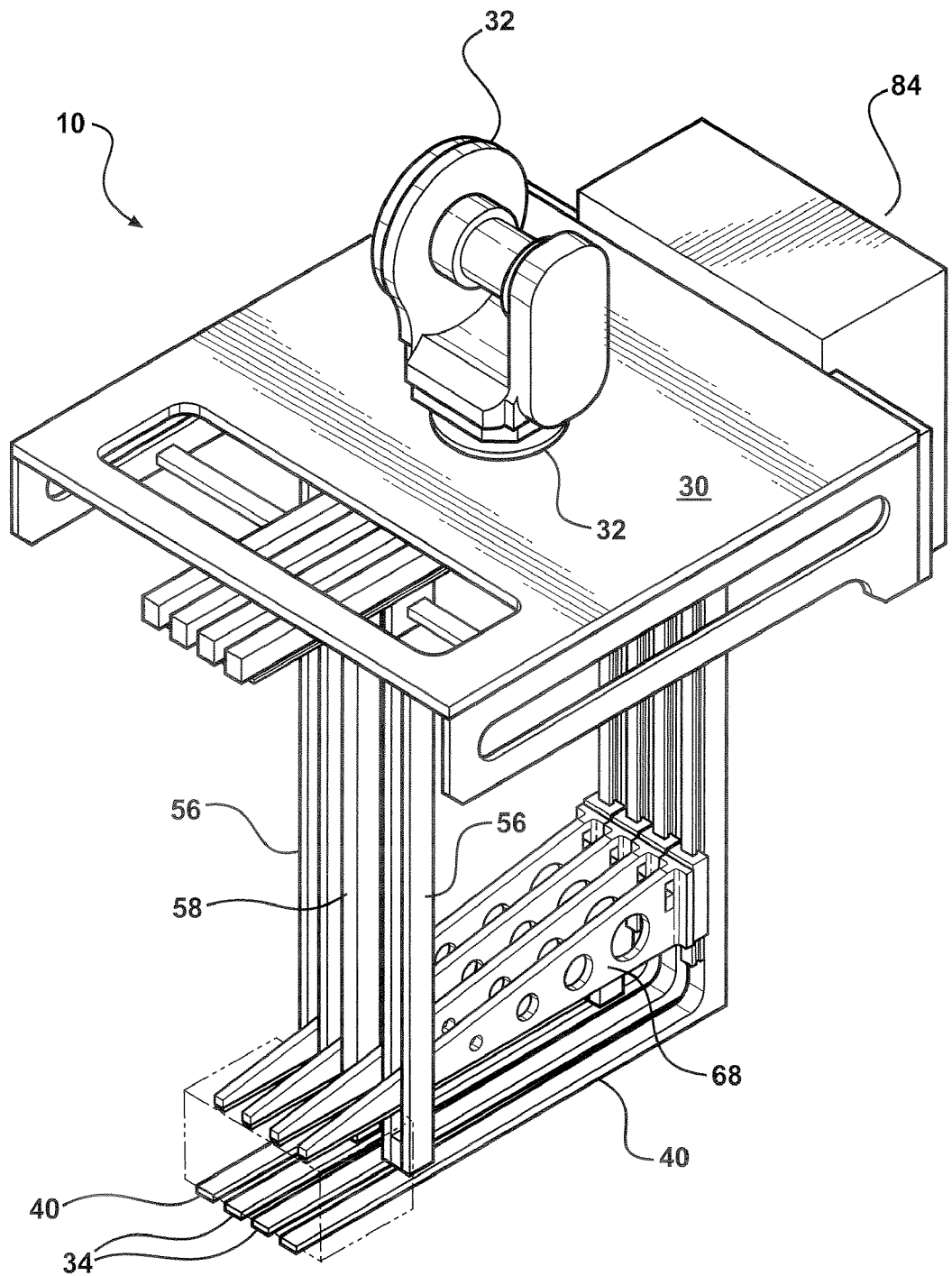
FIG. 5 illustrates the mixed sized product handling end of arm tool of the present invention in the minimum size position.

The 3-servo mixed product handling EOAT 10 of the present invention has the following features:

Servo Motion 1—The rails that support the product during transfer use a combination of fixed rails 34 and outer moveable rails 40. The rail spacing is sized to accommodate the smallest product size; typically this means one or two fixed center rails and two outer rails. The two outer rails 40 are servo-driven sideways from the center fixed rails 34 to allow for pre-sizing of the product 12 (FIG. 3), inwardly for the smallest of products (FIG. 5) and then outwardly to the largest product size (FIG. 4). By doing this, the rails and outer rail supports never overhang outside of the product front and sides, thereby, making it compact to minimize clearances during placement.

Servo Motion 2—In addition, pusher arms 56, 58 "push off" the product simultaneously to the robot motion to withdraw the bottom rails. This provides quicker overall cycle time by not waiting for the rails to withdraw before moving the robot, like in traditional fork type tooling. Instead, the robot is in motion while the product is being removed from the rails. The pusher motion, in conjunction with the coordinated withdrawal of the underneath support of the fork/rails, provides a smooth motion that allows the product to settle down in its place position. The pusher arms 56 also allow automatic sizing to provide just the right sized opening prior to product pickup, allowing quicker cycle times.

Servo Motion 3—The servo-driven top segmented clamping paddle having arms 68 moves up and down, providing a pre-sized opening for the product. When product is picked, the top clamping paddle moves to secure the product against the fixed rails under the product. When product is placed, the servo-driven top segmented paddles raise to just clear of the product allowing, the product to be released. These top segmented paddles have the unique ability to move with the outer rails while still providing clamping at the center fixed rails. This feature allows continuous capturing of the product across the entire width of a product, at the center, and at each end of the product—or anywhere in between—allowing for more secure handling in one servo-driven motion. A distinct advantage of having the top segmented paddles is that movement is in unison with the rails, preventing any overhang of the EOAT beyond the product front or sides, allowing placement of cases against cases.

Additional advantages of the present invention are that the servo-driven motions are part of the robot where the motions are extended axes of the robot and are integrally controlled by the robot. The servo-driven motors of the EOAT are compact, sized for continuous operation, have smooth operation, and powerful braking actions. The controllability of the EOAT allows for incorporation of advanced servo software. The EOAT may come equipped with sensor and/or high resolution pulse coders to enable precise position. Sensing may be incorporated to monitor product presence and may be used in conjunction with robot error recovery routines to quickly assist in establishing handling status and efficient recovery from stopped positions. Further, the servo-driven top paddle can be configured to apply varying forces to limit the securing force on the product.

The EOAT 10 also can generate signals for controlling force applied to the product 12 by the rails 34, 40 and the paddles 68. For example, the torque generated by the servo-motor 70 represents the force being applied to the upper and lower sides of the product 12. Thus, the robot 20 can utilize a feedback signal representing the motor torque to move the paddles 68 and control the force applied to the product 12. In addition, the rotation of the servo-motors 48, 66 and 74 represents the positions of the rails 34, 40, the pusher arms 56, 58, 60, and the paddles 68 respectively. By providing information as to the size (height, width and depth) of the product 12 to the robot 20, the servo-motors 48, 66 and 74 can be controlled to preposition the rails 34, the pusher arms 56, 58, 60, and the paddles 68 to accept the product 12.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A product handling end of arm tool for use with a robot comprising:
    a base;
    a center rail mounted to said base;
    opposing outer rails mounted to said base on either side of said center rail, said outer rails being selectively movable along a first axis for supporting a product in cooperation with said center rail;
    a center pusher arm mounted to said base;
    opposing outer pusher arms mounted to said base on either side of said center pusher arm, wherein said center pusher arm and said outer pusher arms are connected by a guide bar and are movable along a second axis transverse to the first axis for pushing a product off of said rails;
    a central clamping paddle mounted to said center rail; and
    opposing outer clamping paddles mounted to said opposing outer rails on either side of said central clamping paddle, wherein said clamping paddles form a top segmented paddle movable along a third axis transverse to the first and second axes for clamping a product between said rails and said top segmented paddle.

2. The end of arm tool of claim 1 wherein said rails are forked and have a vertical bar extending from said base and a horizontal arm connected to said vertical bar for supporting a product from a bottom side.

3. The end of arm tool of claim 2 wherein said pusher arms extend generally parallel to said vertical bars of said rails and are movable along said horizontal arms of said rails for pushing a product off of said horizontal arms of said rails.

4. The end of arm tool of claim 2 wherein said clamping paddles extend transversely to said vertical bars of said rails and are movable along said vertical bars for clamping a product within said rails and said clamping paddles.

5. The end of arm tool of claim 1 wherein said central rail is fixed to said base.

6. The end of arm tool of claim 1 wherein said outer rails are movable in opposing directions from said central rail and are movable for supporting a product on horizontal arms of said rails.

7. The end of arm tool of claim 1 wherein said center pusher arm is fixed to said guide bar.

8. The end of arm tool of claim 1 wherein said outer pusher arms are movable in opposing directions from said center pusher arm and guided in movement by said guide bar.

9. The end of arm tool of claim 1 and further comprising at least one servo-motor for moving said outer rails, said pusher arms and said clamping paddles.

10. The end of arm tool of claim 9 wherein said outer rails move in conjunction with said pusher arms for automatic sizing of said end of arm tool.

11. The end of arm tool of claim 9 wherein said outer rails move in conjunction with said paddles for continuous capturing of a product.

12. A product handling end of arm tool for use with a robot comprising:
    a base;
    a center rail fixed to said base;
    opposing outer rails mounted to said base on either side of said center rail;
    a center pusher arm mounted to said base;
    opposing outer pusher arms mounted to said base on either side of said center pusher arm, wherein said center pusher arm is fixed to a guide bar and said outer pusher arms are connected by said guide bar;
    a central clamping paddle mounted to said center rail; and
    opposing outer clamping paddles mounted to said opposing outer rails on either side of said central clamping paddle, wherein said clamping paddles form a top segmented paddle, and wherein said opposing outer rails move in conjunction with said pusher arms and said clamping paddles for continuous capturing of a product and automatic sizing of said end of arm tool.

13. The end of arm tool of claim 12 wherein said rails have a vertical bar extending from said base and being connected to a horizontal arm for supporting a product from the bottom side.

14. The end of arm tool of claim 13 wherein said pusher arms extend generally parallel to said vertical bars of said rails and are movable along said horizontal arm of said rails for pushing a product off of said horizontal arms of said rails.

15. The end of arm tool of claim 13 wherein said clamping paddles extend generally parallel to said horizontal arms of said rails and are movable along said vertical bars for clamping a product within said rails and said clamping paddles.

16. The end of arm tool of claim 12 and further comprising a first servo-motor for moving said outer rails, a second servo-motor for moving said pusher arms and a third servo-motor for moving said clamping paddles.

17. A method for transporting a product comprising the steps of:
    providing an end of arm tool adapted to be mounted on a robot arm;
    moving opposing outer rails toward or away from a center rail of the end of arm tool, simultaneously moving opposing outer pusher arms toward or away from a center pusher arm of the end of arm tool, and simultaneously moving clamping paddles toward or away from corresponding rails of said end of arm tool for pre-sizing to a product;
    picking the product with the pre-sized end of arm tool by supporting the product with the rails and positioning the product against the pusher arms; and
    moving the clamping paddles to clamp the product between the rails and the clamping paddles.

18. The method of claim 17 and further comprising the steps of:
    releasing the product from the end of arm tool by raising a segmented clamping paddle; and
    then moving the pusher arms while simultaneously withdrawing the outer and center rails from supporting the product.

19. The method of claim 18 and further comprising the step of pushing the product out of the end of arm tool by moving the pusher arms.

20. The method of claim 17 and further comprising the step of moving the clamping paddle into engagement with the product in response to torque feedback from a servo-motor coupled to the clamping paddle.

* * * * *